United States Patent Office 2,994,652
Patented Aug. 1, 1961

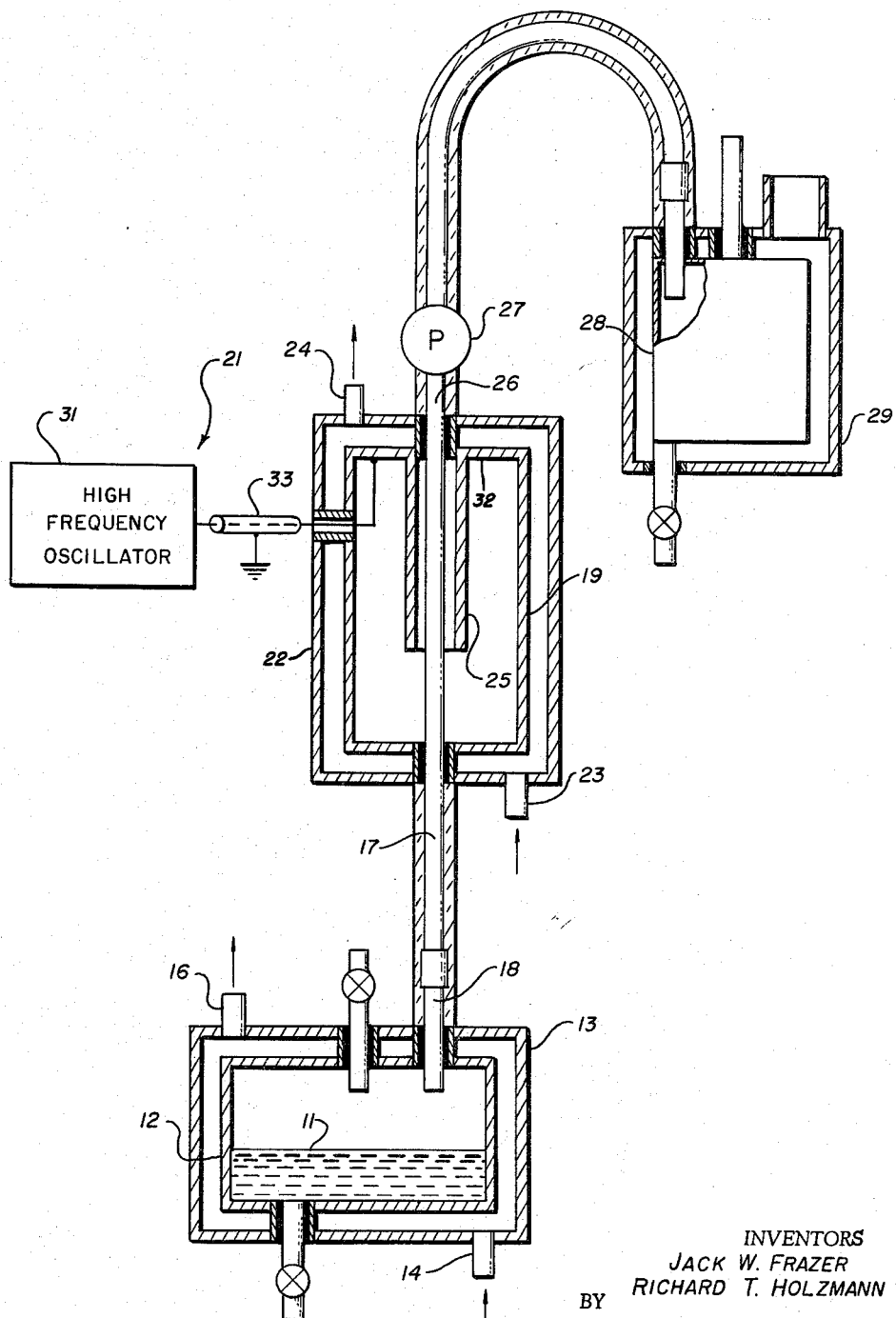

2,994,652
METHOD FOR PRODUCING DIBORON TETRACHLORIDE
Jack W. Frazer, Livermore, Calif., and Richard T. Holzmann, Sparta, N.J., assignors to the United States of America as represented by the United States Atomic Energy Commission
Filed Apr. 6, 1959, Ser. No. 804,554
7 Claims. (Cl. 204—157)

This invention relates to a method for producing diboron tetrachloride. More specifically, the invention relates to a method for promoting the production of diboron tetrachloride by microwave excitation. The invention also relates to the use of microwave excitation as a synthesis tool.

The invention provides a method for promoting formation of a gaseous chemical product by reformation from or reaction of a feed gas, and specifically, for the formation of diboron tetrachloride from boron trichloride. This function is accomplished by subjecting the feed gas to microwave excitation.

Diboron tetrachloride is a colorless gas which ignites in air, which at least partially decomposes at temperatures above 0° C. and which has interesting physical properties. Structurally, the two boron atoms in $B_2Cl_4$ are bonded together, and it is one of the few boron-boron bonds known. Because of the unique boron-boron bond, diboron tetrachloride presents one of the few intermediates from which this bond may be preserved or introduced into other organic compounds. The compound is very active chemically. The chlorine atoms are known to be replaceable by Br, by OR groups in which R is any of a number of organic groupings, and by $N(CH_3)_2$ groups. Hydrogen is adsorbed by $B_2Cl_4$ at room temperatures. A variety of reaction products are reported in the literature, including those resulting from reactions with methyl and ethyl ethers and with ethylene and with other materials, which products may be further modified. A stable BNH polymer may be formed from diboron tetrachloride. $B_2Cl_4$ is also useful in the synthesis of materials having speculative use in high energy rocket fuels and explosives, as well as numerous other organic boron compounds, as indicated above.

Diboron tetrachloride has previously been produced by the reaction of metal borides with chlorine, by the reduction of boron trichloride with metals, metal borides and other reducing agents, and by containment of boron trichloride within an electric discharge through mercury vapor. However, all of these methods are known to be rather inefficient; by the most-successful method, electrical discharge, only a few grams can be made conveniently in a day's time. Hence only small samples of diboron tetrachloride have been available for even research purposes.

From the aforementioned it may be seen that there exists a need for a method of producing diboron tetrachloride by a simpler, more efficient method. Such production would permit use of diboron tetrachloride as an intermediate in the production of other organo-boron compounds and particularly in the production of organo-boron compounds in which a boron-boron bond is desired.

It has now been discovered that microwave excitation may be used to promote reformation reactions of gaseous chemicals, notably of boron trichloride. Specifically, boron trichloride may be reduced to diboron tetrachloride by containing the boron trichloride in a resonating microwave cavity. While optimum operating conditions are not known, the method offers considerable advance over prior methods because a satisfactory, separable yield is obtained by continuously passing $BCl_3$ through a resonating cavity. Any desired quantity may be produced by selections of the proper equiment size and feed rates.

Accordingly, an object of the invention is to provide a method for promoting chemical reactions by microwave excitation.

A further object is to promote reactions between gaseous reactants, and a specific object is to promote the reformation of a gaseous chemical by introduction into a cavity resonating at a wavelength in the microwave region.

Another object of the invention is to provide a method for producing diboron tetrachloride. A further object is to promote reduction of $BCl_3$ to $B_2Cl_4$ by microwave excitation.

Another object of the invention is to produce diboron tetrachloride by pumping gaseous boron trichloride at a low temperature and pressure through a cavity resonating in the microwave region, whereby the boron trichloride is reduced to diboron tetrachloride.

The invention will be better understood upon examination of the following description and figure, which is a cross sectional side view, partly schematic, showing an embodiment of an apparatus for a continuous process for the production of diboron tetrachloride.

In the practice of the invention there is first provided a source or quantity of boron trichloride. This may be of any desired degree of purity, but generally should be at least of technical grade and contained as a liquid. A quantity of the boron trichloride is vaporized or evaporated and passed alone through a resonating microwave cavity, whereby a quantity of the initial reactant gas is converted therein to diboron tetrachloride, which is then removed and cold trapped or otherwise recovered and separated. The invention is adaptable as a continuous process and the unused boron trichloride may be recycled if desired. A long through-time is not required; a single pass through the cavity, as by pumping through a glass tube extending through the cavity, suffices since very little of the microwave intensity is attenuated by the glass. Other materials may be used. The optimum microwave frequency and intensity, if any, are not known.

In a preferred embodiment of the invention, liquid boron trichloride 11 is disposed as a liquid within closed container 12 having a coolant jacket 13 with inlet and outlet ports 14 and 16, respectively. An insulated exit line 17, preferably glass, from outlet 18 of the container 12, extends through the longitudinal center line of a cylindrical, closed resonating cavity 19 having a conventional microwave exciter 21 connected thereto at one end and an outside coolant jacket 22 with inlet and outlet ports 23 and 24, respectively. A centering tube 25 also extends for a portion of the centerline from the end 32 of cavity 19 to which the exciter 21 is connected. The end 26 of line 17 of the source container 12 distal from the cavity 19 passes into the inlet of pump 27 which exhausts into liquid nitrogen cold trap 28 having a coolant jacket 29 open to the atmosphere. While the microwave exciter may comprise any one of numerous conventional designs, a simple embodiment is exemplified in the figure wherein there is shown a high frequency oscillator source 31 connected to the interior cavity wall surface 32 by means of insulated coaxial cable 33 passing therethrough, whereby the microwave is induced within the cavity upon actuation of the source.

In operation, a quantity of boron trichloride is first contained within the closed container 12 at a temperature below the boiling point thereof, namely, −78.5° C. The microwave cavity is maintained at a temperature below 0° C., and the cold trap is maintained at a temperature low enough to condense diboron tetrachloride. The microwave exciter is actuated and a quantity of boron trichloride corresponding to the vapor pressure thereof is drawn through the cavity 19. The product diboron tetrachloride is cold trapped from the reaction products.

The precise chemical mechanism by which the boron trichloride is converted to the diboron tetrachloride is not known, but is thought to be similar to the arc discharge method of the prior art.

*Example I*

An experiment was performed in which diboron tetrachloride was made by the process of the invention using an apparatus substantially the same as that described in the preferred embodiment and shown in the figure. A quantity of boron trichloride was contained in the initial receptacle at −78.5° C. and was pumped off the cavity in the top of the vessel through a 0.9 cm. glass tube. The pumping pressure was approximately 4 mm. Hg. The line from the vessel to the pump extended longitudinally through an intermediate resonating cavity a full wavelength in length excited by a commercially available microwave exciter operating at a wave length of 12.2 cm. in the 2400–2500 megacycle band with a power of 30 to 40 watts. The cavity was cooled by means of $N_2$ gas within a jacket thereabout, the temperature being held at less than 0° C. The boron trichloride through-time was estimated to be less than two seconds. The product was trapped in a cold trap operating at −111° C. The diboron tetrachloride contained therein was purified by fractional distillation of the boron trichloride at −78.5° C. and thereafter identified by its vapor tension and by infra-red spectrum. The determination of free chlorine, also recovered from the cold trap, agreed within experimental error with the diboron tetrachloride produced.

While the invention has been disclosed with respect to several preferred embodiments, it will be apparent to those skilled in the art that numerous variations and modifications may be made within the scope and spirit of the invention and thus it is not intended to limit the invention except as defined in the following claims.

What is claimed is:

1. In a process for producing diboron tetrachloride comprising the steps of passing gaseous boron trichloride through a cavity resonating at a microwave frequency and thereafter recovering the diboron tetrachloride.

2. The process of claim 1 in which the boron trichloride is maintained at a temperature below about 0° C. as it passes through the cavity and the product diboron tetrachloride is recovered in a cold trap.

3. The process of claim 1 in which the pressure of the gaseous boron trichloride within the cavity is approximately 4 mm. Hg.

4. The process of claim 1 in which the diboron tetrachloride is recovered in a liquid nitrogen cold trap and purified by fractional distillation.

5. The process of claim 1 in which said resonating cavity is excited by a conventional microwave exciter operating at a wavelength of 12.2 cm. in the 2400–2500 megacycle band and said boron trichloride is passed therethrough while contained within a glass tube.

6. The process of claim 1 in which said cavity is in the shape of a closed cylinder having a length about the same as the wavelength of the microwave frequency.

7. In a process for producing diboron tetrachloride comprising the steps of passing gaseous boron trichloride at a temperature below 0° C. and a pressure of less than 10 mm. Hg. through a glass tube extending through a resonating cavity operating at a wavelength of 12.2 cm. in the 2400–2500 megacycle band.

References Cited in the file of this patent

UNITED STATES PATENTS

| 2,089,966 | Kassner | Aug. 17, 1937 |
| 2,851,652 | Dicke | Sept. 9, 1958 |
| 2,879,439 | Townes | Mar. 24, 1959 |
| 2,915,709 | Pannaci et al. | Dec. 1, 1959 |

FOREIGN PATENTS

| 697,224 | Great Britain | Sept. 16, 1953 |

OTHER REFERENCES

Journal of American Chemical Society, volume 71 (1949), pages 3265–6.